United States Patent

Limberg

[15] 3,651,346

[45] Mar. 21, 1972

[54] ELECTRICAL CIRCUIT PROVIDING MULTIPLE V BIAS VOLTAGES

[72] Inventor: Allen LeRoy Limberg, Somerville, N.J.

[73] Assignee: RCA Corporation

[22] Filed: Sept. 24, 1970

[21] Appl. No.: 75,015

[52] U.S. Cl. ................................307/296, 307/270, 330/22

[51] Int. Cl. ........................................................H03k 1/00

[58] Field of Search .............................307/270, 296; 330/22

[56] References Cited

UNITED STATES PATENTS

| | | | |
|---|---|---|---|
| 3,566,293 | 2/1971 | Von Recklinghausen | 330/22 |
| 3,392,342 | 7/1968 | Ordower | 330/22 |
| 3,553,500 | 1/1971 | Easter | 330/22 |
| 2,951,208 | 8/1960 | Barton | 330/22 |
| 3,430,155 | 2/1969 | Harwood | 330/22 |

*Primary Examiner*—Donald D. Forrer
*Assistant Examiner*—Harold A. Dixon
*Attorney*—Eugene M. Whitacre

[57] ABSTRACT

An electrical circuit includes a transistor having base and emitter electrodes coupled in parallel with a PN-junction poled in the same direction as the base-emitter junction of the transistor. A first resistor couples the collector electrode of the transistor to a direct voltage source, while second and third resistors serially couple the source to the transistor's emitter electrode. The base electrode of the transistor is coupled to the junction of the second and third resistors, the resistance values of which are selected to provide a predetermined resistance ratio there-between. With the PN-junction then coupled across the third resistor, the resistance value of the first and second resistors are further selected substantially equal to provide a direct voltage output at the collector electrode of the transistor which is primarily dependent on the predetermined resistance ratio between the second and third resistors and independent of the value of the direct voltage source.

9 Claims, 5 Drawing Figures

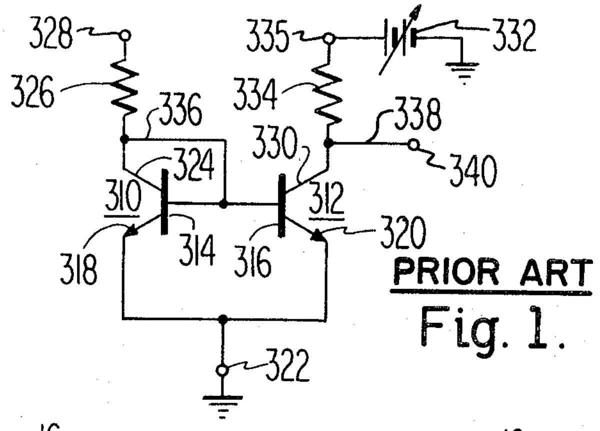
PRIOR ART
Fig. 1.
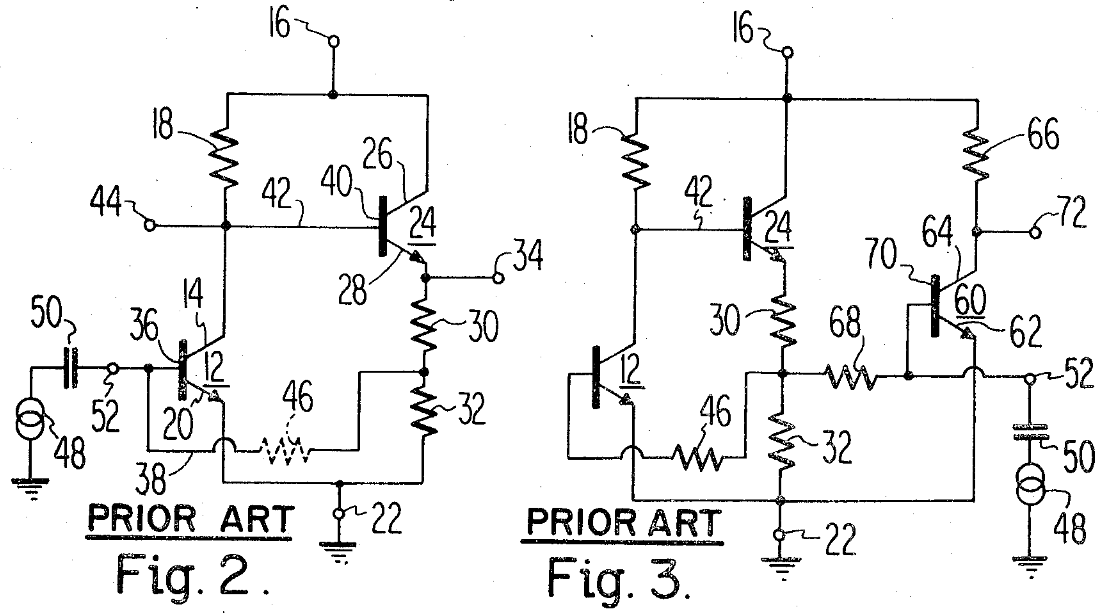
PRIOR ART Fig. 2., PRIOR ART Fig. 3.
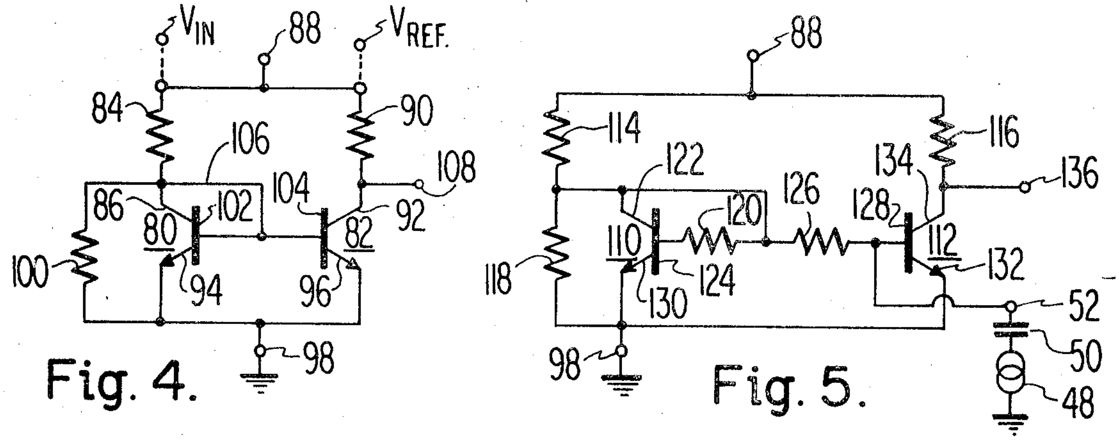
Fig. 4., Fig. 5.
INVENTOR.
Allen L.R. Limberg
BY
Charles Brodsky
ATTORNEY

ELECTRICAL CIRCUIT PROVIDING MULTIPLE V BIAS VOLTAGES

BACKGROUND OF THE INVENTION

1. Field of the Invention

This invention relates to an electrical circuit especially suited for fabrication using integrated circuit techniques and, more particularly, to such a circuit in which similar collector currents flow in transistors of the same type classification having their base electrodes and emitter electrodes connected in parallel, and in semiconductor diodes connected across those same electrodes and closely matched in transistor characteristics.

2. Description of the Prior Art

Such a circuit as described above is disclosed in pending U.S. application Ser. No. 866,122, filed Oct. 8, 1969, now U.S. Pat. No. 3,531,730 and assigned to the same assignee as the present invention. In an embodiment of the invention there disclosed, a pair of integrated transistors A, B have their base electrodes and emitter electrodes connected in parallel and their collector electrodes individually coupled to a pair of resistors. One transistor, A, furthermore, has its collector electrode directly connected to its base electrode to form a rectifier diode. A direct voltage source is connected to the end of the second resistor remote from the collector electrode of the second transistor B, and is effective to controllably reference a developed output signal to a level different from that to which is referenced a corresponding input signal applied to the end of the first resistor remote from its interconnection with the collector electrode of the first transistor A. The control over the output signal level so referenced is primarily dependent upon the value of the direct voltage source, so that temperature variations within the circuit exert substantially little effect upon its operation.

Whereas the Ser. No. 886,122 application references the output signal to a level determined by the value of a direct voltage source, my pending application Ser. No. 680,483, filed Nov. 3, 1967, now U.S. Pat. No. 3,555,309 discloses a modified integrated circuit wherein the output signal is reference to a direct voltage primarily dependent upon the $V_{BE}$ voltage of the transistors employed, where the term $V_{BE}$ represents the average base-to-emitter offset voltage of a transistor which is operating as the active device in an amplifier circuit or the like. Such application also discloses the circuit's ability to provide a direct potential output for amplifier stages which is independent of supply voltage variations.

There, a pair of resistors are serially coupled between the emitter electrode of a first transistor and a point of reference potential such as ground, with the junction between the resistors being coupled to the base electrode of a second transistor having a grounded emitter electrode. A direct connection is further made between the collector electrode of the first mentioned transistor and a point of operating potential, to which the collector electrode of the second transistor is also coupled—by means of a third resistor, for example. The base electrode of the first transistor is also coupled to the collector electrode of the second transistor, and these interconnections form a degenerative feedback loop by means of which a direct voltage equal to one $V_{BE}$ volts will be developed across the base-emitter junction of the second transistor while a direct voltage equal to $(N+1)V_{BE}$ volts will be developed at the emitter electrode of the first transistor, measured with respect to ground. N, in this instance, represents $R_1/R_2$, the ratio between the serially coupled pair of resistors, with the value of the resistor closer to the emitter electrode of the first transistor being in the numerator and that of the farther resistor being in the denominator. Such arrangement as described in my Ser. No. 680,483 application (U.S. Pat. No. 3,555,309) proves advantageous as an operating potential supply in that the developed output voltages exist essentially independently of the direct voltage source and of its variations. The arrangement is also attractive as a coupling stage for translating a signal referenced to a fraction of the operating potential supply voltage to a succeeding stage designed to operate instead with multiple $V_{BE}$ bias voltages.

When the supply voltage circuit of my Ser. No. 680,483 application was used instead as a grounded emitter amplification stage, however, it was noted that the degenerative DC stabilizing action within the feedback loop between the collector and base electrodes of the first transistor had a tendency to lower the AC signal power gain of the stage.

SUMMARY OF THE INVENTION

As will become clear hereinafter, the electrical circuit of the present invention enables higher gain amplifier operation to be attained in an environment where the developed output signal is to be referenced to multiple $V_{BE}$ direct voltages, by adding a third resistor to the configuration of the Ser. No. 866,122 application (U.S. Pat. No. 3,531,730) coupled across the base-emitter junction of the transistor having its base and collector electrodes interconnected to form the rectifier diode. The resulting current flow through this transistor from the direct voltage source is thus decreased by the amount of current diverted through this further resistor and, since similar collector currents flow in the two transistors of the same type classification, results in a correspondingly reduced direct current flow through the collector electrode of the second transistor B. The direct voltage developed at the collector electrode of this second transistor is thus increased, and to a level substantially equal to $(N' + 1)V_{BE}$ volts, where N' represents the resistance ratio between the first and third resistors, presuming the transistors be matched and have a beta value of the order of 50 or more. If the base electrode of the second transistor is decoupled from the collector electrode of the first transistor, signals applied to the base electrode of the second transistor will then be amplified without the feedback network previously used to regulate direct potential level but causing degeneration of the signal amplification.

As will be seen in one embodiment of the invention, the electrical circuit to be described can serve as a bias network for developing multiple $V_{BE}$ voltages. In another arrangement, the circuit can serve as a grounded emitter amplifier in which there exists substantially no degeneration of the applied input signal. Thus, the high gain feature of the invention is preserved, along with the DC referencing to a level independent of supply voltage variations.

BRIEF DESCRIPTION OF THE DRAWINGS

These advantages of the instant invention will become apparent from a consideration of the following detailed descriptions of preferred embodiments thereof in which:

FIG. 1 is a schematic circuit diagram of an electrical circuit similar to that described in pending U.S. application Ser. No. 866,122, now U.S. Pat. No. 3,531,730;

FIG. 2 is a schematic circuit diagram of an electrical circuit similar to that described in my application Ser. No. 680,483, now U.S. Pat. No. 3,555,309;

FIG. 3 is a schematic circuit diagram of a modification of the arrangement of FIG. 2 for referencing to a higher current level yet independent of supply potential;

FIG. 4 is a schematic circuit diagram of an electrical circuit embodying the present invention for operation as a source of regulated operating potential; and FIG. 5 is a schematic circuit diagram showing the source of FIG. 4 biasing a grounded-emitter amplifier stage.

DETAILED DESCRIPTION OF THE INVENTION

Referring now, more particularly, to the prior art circuit of FIG. 1, the arrangement there shown includes a pair of transistors 310 and 312. The base electrodes 314 and 316 of these transistors are interconnected, as are their emitter electrodes 318 and 320 by means of a point of reference of ground potential 322. The collector electrode 324 of transistor 310 is shown coupled via a first resistor 326 to an input terminal 328 while the corresponding electrode 330 of transistor 312 is coupled to a source of controllable direct voltage 332 through a second, equal resistor 334 and a terminal 335. The collector electrode 324 is further connected by a lead 336 to the base electrode 314, thereby arranging transistor 310 to provide a diode or rectifier type action. The collector electrode 330 is similarly connected by a lead 338 to an output terminal 340.

In operation, current will flow in the collector electrode circuit of transistor 310 when the instantaneous value of an input signal applied to terminal 328 exceeds the average forward base-to-emitter $V_{BE}$ voltage of that transistor, developed at the collector electrode 324. Since the base electrodes 314 and 316 and the emitter electrodes 318 and 320 of the two transistors are connected together, and assuming the transistors 310 and 312 are of the same type classification, or essentially alike, similar collector currents will flow in each. Where the transistors 310 and 312 are further constructed on a monolithic integrated circuit chip, these currents will tend to be identical because the base-to-emitter voltages of the transistors will be equal and because the transistors would share the same thermal environment and have like diffusion profiles. It will, therefore, be seen that the value of these collector currents will be given by:

$$i_{310}=i_{312}=\frac{V_{in}-V_{BE_{310}}}{R_{326}} \qquad (1)$$

where $i_{310}$ and $i_{312}$ = the collector electrode currents of transistors 310 and 312 respectively, in milliamperes when:

$V_{in}$ = the instantaneous value of an input signal applied to terminal 328, in volts;

$V_{BE_{310}}$ = the forward base-to-emitter voltage of transistor 310, in volts; and $R_{326}$ = the resistance value of resistor 326, in kilohms.

The signal then developed at output terminal 340 by the current flow $i_{312}$ through resistor 334 can be expressed as:

$$V_{out}=V_{ref}-\frac{R_{334}}{R_{326}}(V_{in}-V_{BE_{310}}) \qquad (2)$$

where $V_{ref}$ = the value of the direct voltage source 332, in volts;

$R_{334}$ = the resistance value of resistor 334, in kilohms; and $V_{in}$, $V_{BE_{310}}$ and $R_{326}$ are as previously defined.

It will be apparent from this latter expression that the DC level of the developed output signal can be primarily controlled by varying the value of the voltage source 332. Variation of the resistance ratio $R_{334}/R_{326}$ to vary the effect of the DC component of the applied input signal or of the forward voltage of transistor 310 offers only secondary control in determining the output DC level, and is not generally available where resistors 326 and 334 are fixed. The resistance ratio $R_{334}/R_{326}$, furthermore, will be relatively stable in an integrated circuit structure in the presence of temperature variations so that control of the output DC level will remain substantially constant during temperature changes. In this regard, it will be understood that any change in the DC level tending to be produced by variations in the base-to-emitter voltage $V_{BE_{310}}$ with such temperature variations would be of a minor nature, and, if desired, may be easily compensated. It will also be apparent that if the ratio between voltages $V_{ref}$ and $V_{in}$ is selected to equal the ratio between resistors 334 and 326, then expression (2) reduces to:

$$V_{out}=\left(\frac{V_{ref}}{V_{in}}\right)V_{BE_{310}} \qquad (3)$$

Referring now to FIG. 2, the arrangement there shown in solid lines is identical to the supply voltage circuit disclosed in my Ser. No. 680,483 application, which, with the further connections shown in phantom, serves to bias a grounded emitter transistor amplifier to a direct voltage equal to a multiple of $V_{BE}$ base-to-emitter voltage offsets. One transistor 12 is arranged in a common-emitter type configuration, with its collector electrode 14 connected to an energizing potential terminal 16 through a resistor 18 and with its emitter electrode 20 connected to a reference terminal 22, which is shown at ground potential. A second transistor 24 is arranged in a common collector type configuration with its collector electrode 26 connected to the energizing potential terminal 16 and with its emitter electrode 28 connected to the reference terminal 22 through a pair of serially coupled resistors 30 and 32. The emitter electrode 28 of transistor 24 is connected to a first output terminal 34 while the junction between the resistors 30 and 32 is connected to the base electrode 36 of transistor 12 by a lead 38. The collector electrode 14 of transistor 12 is additionally connected to the base electrode 40 of transistor 24 by a lead 42 and to a second output terminal 44. Appropriate load circuits (not shown) can be connected between each of the first and second output terminals 34 and 44 and reference terminal 22, respectively. Potential terminal 16 and reference terminal 22 are adapted to be connected to a source of energizing potential of proper polarity (also not shown).

In the operation of the supply circuit of FIG. 2, i.e., with a proper polarity potential source connected between the terminals 16 and 22, a point of equilibrium is reached at which one $V_{BE}$ voltage offset drop is developed across the base-emitter junctions of each of the transistors 12 and 24. The series combination of the base-emitter junction of transistor 24 and resistor 30, however, is connected in parallel with the collector-base junction of transistor 12 by leads 38 and 42. The quiescent voltage developed between the collector and emitter electrodes of the transistor 12, therefore, equals the sum of the $V_{BE}$ voltage drops of transistors 12 and 24 and the voltage drop across resistor 30. With the emitter electrode 20 of transistor 12 grounded via terminal 22, a potential equal to the $V_{BE}$ voltage drop of transistor 12 is developed at the common junction of resistors 30 and 32 relative to the ground terminal 22, while a potential equal to that $V_{BE}$ voltage plus the voltage drop across the resistor 30 is developed at output terminal 34 relative to ground. With a resistance value for resistor 32 which is small relative to the input impedance of the transistor 12, as can be seen from the drawing, this latter voltage drop substantially equals $NV_{BE}$, where N represents the resistance ratio between resistors 30 and 32, with the resistance value of the resistor 30 being in the numerator and with that of the resistor 32 being in the denominator. The potential developed at the output terminal 34 with respect to ground thus is seen to be $(N+1)V_{Be}$. Where transistors 12 and 24 are each composed of the same semiconductor material, such as in a monolithic silicon integrated structure, the potential developed at the collector electrode 14 of transistor 12 and coupled to the output terminal 44 would be $(N+2)V_{BE}$ relative to the terminal 22. If the terminal 22 were not grounded but were at some level of direct voltage instead, then the output potential developed at terminals 34 and 44 would each be increased by the amount of that direct voltage. As is described in that Ser. No. 680,483 application, the supply voltage circuit of the drawing is a stabilized circuit in that the degenerative feedback loop bounded by the collector-base junction of transistor 12, the lead 38, the base-emitter junction of the transistor 24, the resistor 30, and the lead 42 balances out any voltage variations in the supply due to changes in the operating potential applied between terminals 16 and 22.

In a manner described in my aforesaid application, the supply voltage circuit of FIG. 2 can be used as a grounded-emitter transistor amplifier by adding the dotted line connections shown in the drawing. In particular, a resistor 46 is inserted into the lead 38 coupling the junction of resistors 30 and 32 to the base electrode 36 of transistor 12 while an alternating current signal is supplied from a signal source 48 to that same base electrode 36 by means of a capacitor 50 and input terminal 52. It will be understood, however, that in an integrated circuit version of this amplifier, both the source 48 and the capacitor 50 will be external to the monolithic chip, but will be connected to the remainder of the amplifier circuitry thereon via the terminal 52.

With such an arrangement, and with the resistance value for the resistor 46 selected large compared to the values for the resistors 30 and 32, the choice of the resistance ratio for the latter two resistors once again determines the DC voltage established at the output terminal 34. More particularly, by selecting resistor 46 to be of a value not so large as to produce a significant voltage drop across it due to the base current flow of transistor 12, the degenerative feedback action within the loop between the collector and base electrodes of the transistor 12 is such as to establish at terminal 34 a DC voltage equal to the afore defined $(N + 1)V_{BE}$ level. However, the degenerative action reduces the AC signal power gain of the stage as well. Unless the signal source 48 and capacitor 50 are of an impedance at the input signal frequency which is considerably smaller than the resistance value of the parallel combination of the resistors 30 and 32, this reduction will evidence itself as a loss of AC signal voltage gain. This parallel equivalent may be of the order of 1,000 ohms or so, and thus the range of components available for the driving network is restricted to low values if such signal voltage gain is desired.

A second amplifier embodiment is shown in FIG. 3, and is similar in many respects to the configuration of FIG. 2. Thus, the elements 12, 18, 24, 30, 32, and 46 may be equivalent to similarly referenced elements of FIG. 2 and connected in like manner. The FIG. 3 arrangement differs in its addition of a third transistor 60, having its emitter electrode 62 directly coupled to the reference potential terminal 22 and its collector electrode 64 coupled via a resistor 66 to the operating potential terminal 16. A further resistor 68 is included to couple the junction of resistors 30 and 32 to the base electrode 70 of transistor 60, while the signal source 48 is coupled by means of the capacitor 50, and input terminal 52 to that same base electrode 70. In addition, resistor 66 is selected to have a resistance value equal to that of the resistor 18, while resistor 68 is similarly selected equal to resistor 46.

It will be seen from FIG. 3 that the amplifying function is here provided solely by the grounded emitter transistor 60, with the arrangement of FIG. 2 serving merely as a stabilized bias network for that transistor. It will also be seen that the degenerative feedback loop which serves to stabilize the direct bias voltage developed is divorced from the input signal circuit so that no substantial degeneration of AC signal gain exists. Thus, the arrangement of FIG. 3 overcomes the disadvantage of the FIG. 2 configuration in that circuit gain is enhanced.

If transistor 12 and 60 are fabricated with identical base-to-emitter junction areas on the same monolithic chip, the output, taken at the collector electrode 64 of transistor 60 at terminal 72, will be reference to a direct voltage equal to $(N + 2)V_{BE}$, as distinct from the $(N + 1)V_{BE}$ level of the previous drawing. This follows because the voltage at the junction of resistors 30 and 32 drive identical input circuits through equal resistors 46 and 68 so that equal currents will flow in the collector electrode circuits of the respective transistors, and through the resistors 18 and 66. Since, as was mentioned with respect to FIG. 2, the direct voltage developed at the collector electrode 14 of transistor 12 is equal to $(N + 2)V_{BE}$ volts, the direct voltage developed at the collector electrode 64 of transistor 60 will be positive with respect to ground by this same amount. Thus, it will be seen that the FIG. 3 arrangement is one affording increased AC signal gain with referencing to a direct voltage equal to a multiple of $V_{BE}$. But, unfortunately, the arrangement of FIG. 3 is somewhat more complicated than the arrangement of FIG. 2 due to its use of three additional circuit elements and its increase of current demand from the operating potential supply.

The configuration of FIG. 4 constructed in accordance with the invention, on the other hand, can be employed as a supply circuit providing direct potentials at multiple $V_{BE}$ levels in much the same manner as FIG. 2, and can further be used as a high gain amplifier with reduced complexity as compared with the prior art configuration of FIG. 3. As will be also apparent, the arrangement of FIG. 4 is very similar to the configuration as shown in FIG. 1, differing therefrom by the inclusion of a resistor to divert some current flow away from the diode-connected transistor of that configuration and by the use of a common supply source. Thus, in FIG. 4 a pair of transistors 80 and 82 are shown. A first resistor 84 couples the collector electrode 86 of the transistor 80 to an energizing potential terminal 88 while an equal valued resistor 90 couples the corresponding collector electrode 92 of the transistor 82 to that same terminal 88. The emitter electrodes 94 and 96 of the transistors 80 and 82 are similarly each coupled to a reference terminal 98 (shown at ground) while a further resistor 100 couples the collector electrode 86 of transistor 80 to that same reference terminal 98. Also in the manner shown with respect to FIG. 3, the base electrodes 102 and 104 of the transistors 80 and 82, respectively, are connected together, with the collector electrode 86 of transistor 80 being directly connected to its base electrode 102 by a lead 106 to provide the afore-described diode or rectifier type operation. As will be readily apparent, this arrangement differs from that previously described in the addition of the resistor 100 shunting the diode connected transistor 80 and in the use of a single source of direct voltage for operating the two transistors.

Just as with the arrangement of FIG. 3, substantially equal currents flow in the collector electrode circuits of transistors 80 and 82 of FIG. 4 when those transistors are of the same type classification and closely matched in transistor characteristics. This is especially so in integrated circuit fabrications where additionally, the betas of the transistors are of fairly high values. The direct current flow through resistor 90 thus substantially equals the difference in direct current through resistors 84 and 100 as given by the expression:

$$I_{R_{90}} = \frac{V_{S_{88}} - V_{BE_{80}}}{R_{84}} - \frac{V_{BE_{80}}}{R_{100}} \quad (4)$$

where $V_{S_{88}}$ = the value of the direct voltage source coupled to the energizing potential terminal 88, in volts;

$R_{84}$ = the resistance value of resistor 84, in kilohms; and $R_{100}$ = the resistance value of resistor 100, in kilohms;

and where $V_{BE}$ is as previously defined. The direct voltage developed at a terminal 108 coupled to the collector electrode 92 of transistor 82 is therefore representable with respect to ground as the difference between the supply voltage $V_{S_{88}}$ and the voltage drop across resistor 90 given by the expression:

$$V_{108} = V_{S_{88}} - R_{90}\left(\frac{V_{S_{88}} - V_{BE_{80}}}{R_{84}} - \frac{V_{BE_{80}}}{R_{100}}\right) = (N'+1)V_{BE_{80}} \quad (5)$$

where N' represents the resistance ratio between resistors 84 and 100 when resistors 84 and 90 are equal, as stated above. Thus, as with the supply of FIG. 2, the arrangement of FIG. 4 provides an output voltage having a potential equal to a multiple of $V_{BE}$, with the multiple being dependent purely on resistance ratios. As will be readily apparent, the resistance ratio $R_{84}/R_{100}$ will be relatively stable in an integrated circuit structure in the presence of temperature variations so that the output DC multiple will remain substantially constant during temperature changes.

The equations 4 and 5 have presumed that both resistors 84 and 90 are returned to the same direct potential supplied at terminal 88. Also, the transistors 80 and 82 which have like diffusion profiles have also been presumed to have similar effective emitter areas. A more general case is that resistor 84 returns to a direct potential $V_{in}$ while resistor 90 returns to a direct potential $V_{ref}$, as shown in dotted lines, and that the effective emitter areas of transistor 82 is $k$ times as large as that of transistor 80 causing the collector current of transistor 82 to be $k$ times as large as that of transistor 80 for the same base-emitter offset voltage. The derivation of defining equations for $V_{out}$ and for removing power supply voltage dependency develop as below, using methods similar to those used to derive the more specific case.

$$I_{R_{84}} = \frac{(V_{in} - V_{BE_{80}})}{R_{84}} - \frac{V_{BE_{80}}}{R_{100}}$$

$$I_{R_{90}} = kI_{R_{84}} = k\left[\frac{(V_{in} - V_{BE_{80}})}{R_{84}} - \frac{V_{BE_{80}}}{R_{100}}\right]$$

$$V_{out} = V_{ref} - kR_{90}\left[\frac{(V_{in} - V_{BE_{80}})}{R_{84}} - \frac{V_{BE_{80}}}{R_{100}}\right]$$

$$V_{out} = \left[V_{ref} - kV_{in}\frac{R_{90}}{R_{84}}\right] + \left[\frac{kR_{90}(R_{84}R_{100})}{R_{84} + R_{100}} V_{BE_{80}}\right]$$

To remove the dependency upon the direct potentials $V_{ref}$ provided by the source of operating potential and $V_{in}$ provided by the direct potential component of input signal or a second source of operating potential, the potentials $V_{ref}$ and $V_{in}$ must be held in fixed proportionality to each other so that the first term of the equation above can be reduced to zero. Then the relationship below obtains.

$$R_{84}/R_{90} = k\, V_{in}/V_{ref}$$

That is, proper selection of the ratio of the resistances of resistors 84 and 90 will cause a $V_{out}$ which is a multiple of $V_{BE_{80}}$, as defined by:

$$V_{out} = \left(1 + \frac{R_{84}}{R_{100}}\right)\left(\frac{V_{ref}}{V_{in}}\right) V_{BE_{80}} \qquad (6)$$

Proper selection of $R_{100}$ permits a wide selection of the multiple of $V_{BE}$ to which the direct potential at terminal 108 can be biased.

The operating characteristic of this more general case circuit is to be noted. When an input signal and attendant direct potential $V_{in}$ are applied to the end of resistor 84 remote from the joined collector and base electrodes of transistor 80, if the direct potential $V_{in}$ be sufficiently large to bias diode-connected transistor 80 well into conduction, the shunt resistance of resistor 100 will be negligible compared to the dynamic resistance of the diode-connected transistor in circuits with resistor values chosen within practical constraints upon dissipation. The voltage gain for signal of this circuit is then defined by:

$$V_{out}/V_{in} = R_{90}/R_{84} \qquad (7)$$

This is the same voltage gain for signal as for the circuit of FIG. 1; the additional flexibility of choice in selecting the direct potential at the output terminal 108 does not call for a sacrifice in gain. This operating characteristic can be utilized in circuits similar to those shown in FIGS. 1 and 4, except for two input signals with direct voltage components being applied through separate resistors to the diode-connected transistor. The two signals will be additively matrixed without their sources interacting with each other, the low dynamic resistance of the diode-connected transistor acting to isolate them.

The arrangement of FIG. 5 is an adaptation of the supply of FIG. 4 as it would be used in a signal amplifier configuration providing higher gain than that provided by the amplifier of FIG. 2 yet maintaining the output signal referenced to a multiple $V_{BE}$ direct voltage. As shown, the FIG. 5 construction includes transistors 110, 112, substantially identical to the corresponding elements 80 and 82 of FIG. 4, along with corresponding resistors 114, 116, and 118 analogous to elements 84, 90, and 100 of the aforesaid drawing. A further resistor 120 is included to couple the collector electrode 122 of transistor 110 to its base electrode 124 while an equal valued resistor 126 is included to couple the first resistor 120 to the base electrode 128 of transistor 112. Also coupled to the base electrode 128 is the input signal to be amplified, supplied from signal source 48 via capacitor 50 and input terminal 52. As noted with the arrangement of FIG. 4, the resistance value of resistor 116 is selected equal to the resistance value of resistor 114, and the respective emitter electrodes of the two transistors 130, 132 are directly coupled to the ground terminal 98.

By selecting the resistance value of resistors 120 and 126 such that the base current flows therethrough under quiescent conditions produce negligible voltage drops thereacross, the arrangement of FIG. 5 substantially reduces to the configuration of FIG. 4. Thus, in the manner there described, the output voltage developed at the collector electrode 134 of transistor 112 (i.e., at output terminal 136) is at the same (N' +1) $V_{BE}$ level with respect to ground, where N', in this case, represents the ratio of the resistance values of resistors 114 and 118. By similarly selecting the resistance values for resistors 120 and 126 to be larger than the dynamic output impedance existant at the collector electrode 122 of the transistor 110, substantially no degeneration will exist with respect to the input signal supplied from the source 48 to the base electrode 128 of the transistor 112. The resultant gain afforded such input signal will therefore be substantially higher than that effected with the arrangement of FIG. 2, but in a manner simpler than with the construction shown in FIG. 3. That is, by comparing the arrangement of FIG. 5 with that of FIG. 3, it will be seen that the FIG. 5 arrangement effects a savings of one resistor and one transistor which, in an integrated circuit environment, may represent a savings in the space utilized on the monolithic chip. More importantly, however, the savings of the transistor effects a comparable savings in the amount of current drained from the direct voltage source coupled to the supply terminal 88 and available for all circuits on the chip substrate. Thus, the arrangement of FIG. 5 will be seen to overcome some of the disadvantages previously noted with respect to the FIG. 2 and FIG. 3 configurations at the same time that it provides the additional desirable feature of referencing the developed output signal to a potential which is substantially free of any random variations produced at the potential terminal 88. Such variations oftentimes arise due to common impedance coupling to the direct voltage source at that terminal from the various other circuits on the integrated chip. It will also be seen that a tighter feedback network is present in the FIG. 4 construction than in the amplifier of FIG. 3, to enhance operating stability by reducing possible phase shifts in the circuit.

What is claimed is:

1. In an electrical circuit of the type including:

a. a first semiconductor device having at least first and second electrodes;

b. a second semiconductor device having first, second, and third electrodes and exhibiting conduction characteristics substantially related to such characteristics as are exhibited by said first device;

c. means directly connecting said first electrodes of said semiconductor devices to each other;

d. means directly connecting said second electrode of said semiconductor devices to each other;

e. a first resistance connected to said first electrode of said first semiconductor device for applying a first direct energizing potential to said first device; and f. a second resistance of value substantially equal to that of said first resistance connected to said third electrode of said second semiconductor device for applying a second direct energizing potential to said second device, the combination therewith of:

means including a third resistance connected between said first and second electrodes of said first semiconductor device for diverting some of the current flowtherethrough from said first direct energizing potential and selected of a value to provide a direct voltage at said third electrode of said second semiconductor device which is referenced to a level substantially equal to an (N' + 1) multiple of the voltage drop developed between said first and second electrodes of said first semiconductor device, and independent of the magnitudes of or ratios between said first and second direct energizing potentials, where N' represents the ratio of resistance values between said first and third resistances, with the resistance value of said first resistance being in the numerator and with the resistance value of said third resistance being in the denominator.

2. The combination of claim 1 wherein said first semiconductor device also has a third electrode, said first and second semiconductor devices comprise first and second transistors, and said first, second and third electrodes correspond to the base, emitter and collector electrodes of said transistors, respectively and wherein said third resistance is connected in parallel with the base and emitter electrodes of said first transistor to provide a direct voltage at said collector electrode of said second transistor measured with respect to its emitter electrode substantially equal to (N' + 1) times the voltage drop between the base and emitter electrodes of said first transistor.

3. The combination of claim 2 wherein said first and second direct energizing potentials respectively connected to said first and second transistors are substantially equal.

4. The combination of claim 3 wherein said first, second and third resistances comprise first, second and third resistors, respectively, wherein there are additionally included fourth and fifth resistors serially connecting said base electrodes of said first and second transistors, wherein said collector electrode of said first transistor is connected to the junction of said fourth and fifth resistors, and wherein means are included for supplying input signals to the base electrode of said second transistor to be amplified thereby to be developed at the collector electrode of said second transistor referenced to a level equal to the direct voltage provided thereat independent of the direct voltage to which said input signals are initially referenced.

5. The combination of claim 4 wherein said fourth and fifth resistors are selected of substantially equal resistance value.

6. An electrical circuit comprising:

first, second and third terminals;

first and second transistors, each having emitter, base and collector electrodes;

a first resistor coupling the collector electrode of said first transistor to said first terminal;

a second resistor coupling the collector electrode of said second transistor to said second terminal, and having substantially the same resistance value as said first resistor;

a third resistor coupling the collector electrode of said first transistor to said third terminal;

first means respectively coupling the base electrodes of said first and second transistors;

direct current connections from the emitter electrodes of said first and second transistors to said third terminal; and second means coupling the base and collector electrodes of said first transistor to provide, when first and second sources of direct energizing potential are coupled between said first and second terminals and said third terminal respectively, a direct voltage at the collector electrode of said second transistor measured with respect to its emitter electrode substantially equal to (N' + 1) times the voltage drop between the base and emitter electrodes of said first transistor, where N' represents the ratio of resistance values between said first and third resistances, with the resistance value of said first resistor being in the numerator and with the resistance value of said third resistor being in the denominator.

7. The electrical circuit of claim 6 wherein said first and second terminals are interconnected to receive a single source of direct energizing potential and wherein the direct voltage provided at the collector electrode of said second transistor is substantially independent of the magnitude of said single energizing potential source.

8. The electrical circuit of claim 7 wherein said first and second means each comprise direct current connections.

9. The electrical circuit of claim 7 wherein said first means comprises fourth and fifth resistors serially coupling the base electrodes of said first and second transistors and wherein said second means comprises a direct current connection between the collector electrode of said first transistor and the junction between said fourth and fifth resistors.

* * * * *

UNITED STATES PATENT OFFICE
CERTIFICATE OF CORRECTION

Patent No. 3,651,346 Dated March 21, 1972

Inventor(s) Allen LeRoy Limberg

It is certified that error appears in the above-identified patent and that said Letters Patent are hereby corrected as shown below:

IN THE TITLE:

"ELECTRICAL CIRCUIT PROVIDING MULTIPLE V BIAS VOLTAGES" should read -- ELECTRICAL CIRCUIT PROVIDING MULTIPLE $V_{BE}$ BIAS VOLTAGES -- .

IN THE SPECIFICATION:

Column 1, Line 36 - "the Serial No. 886,122" should read -- the Serial No. 866,122 -- .

Column 2, Line 58 - after "higher" insert -- direct --.

Column 7, Line 28 - "$V_{BE}$" should read -- $V_{BE_{80}}$ --.

Signed and sealed this 1st day of May 1973.

(SEAL)
Attest:

EDWARD M. FLETCHER, JR.
Attesting Officer

ROBERT GOTTSCHALK
Commissioner of Patents